(12) United States Patent
Larsen et al.

(10) Patent No.: US 8,997,594 B2
(45) Date of Patent: Apr. 7, 2015

(54) TRANSMISSION GEAR RATIO CHANGING WITHOUT DISASSEMBLY FOR A WORK MACHINE

(75) Inventors: Herbert Allen Larsen, Cedar Falls, IA (US); Raymond Donald Meek, Waverly, IA (US); Roman Cisek, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 896 days.

(21) Appl. No.: 13/000,539

(22) PCT Filed: Jul. 3, 2008

(86) PCT No.: PCT/US2008/008272
§ 371 (c)(1),
(2), (4) Date: Dec. 21, 2010

(87) PCT Pub. No.: WO2010/002368
PCT Pub. Date: Jan. 7, 2010

(65) Prior Publication Data
US 2011/0259132 A1   Oct. 27, 2011

(51) Int. Cl.
*F16H 3/08* (2006.01)
*F16H 57/031* (2012.01)
*F16H 3/00* (2006.01)
*F16H 57/02* (2012.01)
*F16H 57/023* (2012.01)

(52) U.S. Cl.
CPC .............. *F16H 57/031* (2013.01); *F16H 3/001* (2013.01); *F16H 2057/02043* (2013.01); *F16H 2057/02056* (2013.01); *F16H 2057/0235* (2013.01)

(58) Field of Classification Search
CPC ....................... F16H 57/031; F16H 2057/0335
USPC ................................................... 74/325, 329
See application file for complete search history.

(56) References Cited

U.S. PATENT DOCUMENTS 3,486,207 A * 12/1969 Polzin ........................ 29/407.1
3,862,672 A *  1/1975 Tappen et al. .............. 184/6.12
6,029,532 A *  2/2000 Phillips ..................... 74/421 R

FOREIGN PATENT DOCUMENTS

CN       2521080 Y    11/2002
DE       4102084 A1    8/1991
FR       2690114 A1   10/1993

OTHER PUBLICATIONS

European Search Report dated May 24, 2013 (6 pages).

* cited by examiner

*Primary Examiner* — William Kelleher
*Assistant Examiner* — Terence Boes
(74) *Attorney, Agent, or Firm* — Quarles & Brady LLP

(57) ABSTRACT

A transmission (12) for a vehicle (10) includes a gear arrangement having a gear shaft (44) and a gear (48,66) mounted to the gear shaft (44). The gear (48,66) is axially movable and rotationally fixed relative to the gear shaft (44). A housing (28) includes an access opening (56) and an access cover (54) over the access opening (56). The access cover (54) rotatably carries one end of the gear shaft (44). The access opening (56) is sized and shaped to allow the gear (48,66) to be moved through and out of the housing (28).

11 Claims, 4 Drawing Sheets

TRANSMISSION GEAR RATIO CHANGING WITHOUT DISASSEMBLY FOR A WORK MACHINE

FIELD OF THE INVENTION

The present invention relates to work machines, and, more particularly, to transmissions used in such work machines.

BACKGROUND OF THE INVENTION

A work machine such as an agricultural tractor may be driven with motive force taking several different forms, such as a rear wheel drive, four wheel drive (4WD), mechanical front wheel drive (MFWD), track-type drive, etc. In the case of an MFWD equipped tractor, the front wheel drive typically is not full time, and an electronic switch in the operator's station is used to switch between rear wheel drive and MFWD mode.

An MFWD tractor may include an internal combustion (IC) engine which provides input power to a transmission, which in turn is coupled with and drives the rear axles through a rear end differential. The transmission may also include an output shaft, typically facing in the forward direction, which connects via a drive shaft or the like with the MFWD at the front end of the tractor.

An operator may order a new MFWD equipped tractor with a selected tire combination between the front and rear tires, or may desire to change to a different tire combination for some reason. Depending on the selected tire combination, the transmission may need to have a different gear ratio for the output shaft to the MFWD. Conventional transmissions with an output shaft for an MFWD typically do no allow the gear ratio to be easily changed, either during initial assembly or in a retrofit situation. It is thus necessary to use a different transmission with a different gear ratio, or disassemble the transmission and replace the gear set coupled with the MFWD output shaft. Either solution is not optimal for efficiency and cost.

What is needed in the art is a tractor with a transmission which may be modified to provide a different gear ratio to the MFWD output shaft, without having to completely disassemble or replace the transmission.

SUMMARY OF THE INVENTION

The invention in one form is directed to a transmission for a vehicle, including a gear arrangement having a gear shaft and a gear mounted to the gear shaft. The gear is axially movable and rotationally fixed relative to the gear shaft. A housing includes an access opening and an access cover over the access opening. The access cover rotatably carries one end of the gear shaft. The access opening is sized and shaped to allow the gear to be moved through and out of the housing.

The invention in another form is directed to a transmission kit for a vehicle, including a power output having an output shaft and an output gear carried by the output shaft. An idler arrangement has an idler shaft and a plurality of drive gears. Each drive gear is selectively mountable to the idler shaft so as to be axially movable and rotationally fixed relative to the idler shaft. Each drive gear has a different number of teeth relative to another drive gear, and each drive gear is configured for driving the output gear. A housing includes an access opening and an access cover over the opening. The access cover rotatably carries one end of the idler shaft, and the access opening is sized and shaped to allow the drive gear to be moved through and out of the housing.

The invention in yet another form is directed to a work machine, including an engine and a transmission coupled with the engine. The transmission includes a power input with an input shaft and an input gear carried by the input shaft, and a power output with an output shaft and an output gear carried by the output shaft. An idler arrangement mechanically interconnects the input gear and the output gear. The idler arrangement includes an idler shaft and a drive gear. The drive gear is mounted to the idler shaft so as to be axially movable and rotationally fixed relative to the idler shaft. A housing includes an access opening and an access cover over the opening. The access cover rotatably carries one end of the idler shaft, and the access opening is sized and shaped to allow the drive gear to be moved through and out of the housing.

DETAILED DESCRIPTION OF THE INVENTION

Figure 1:
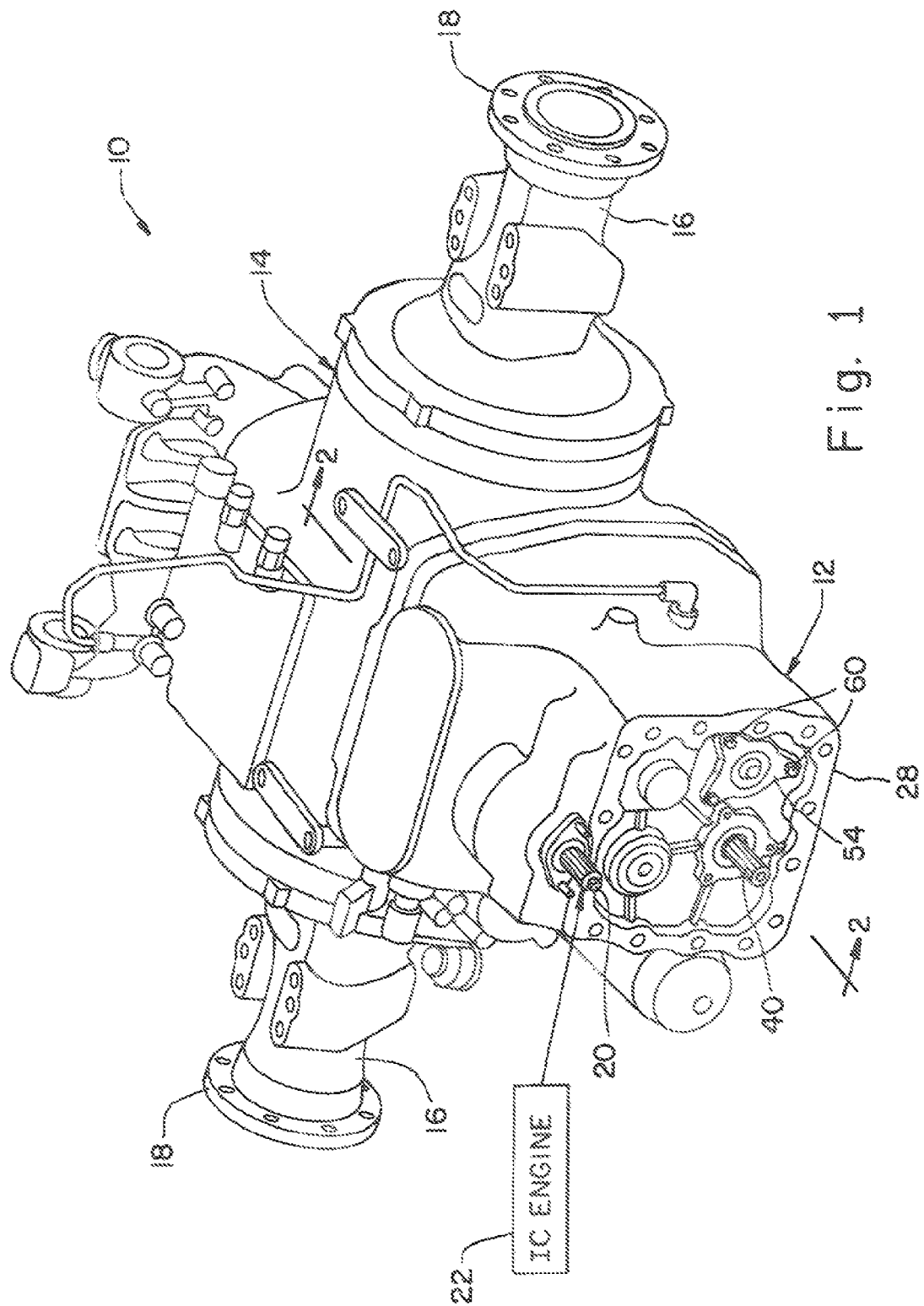
FIG. 1 is a perspective view of an embodiment of a transmission of the present invention used in an agricultural tractor.
Figure 2:
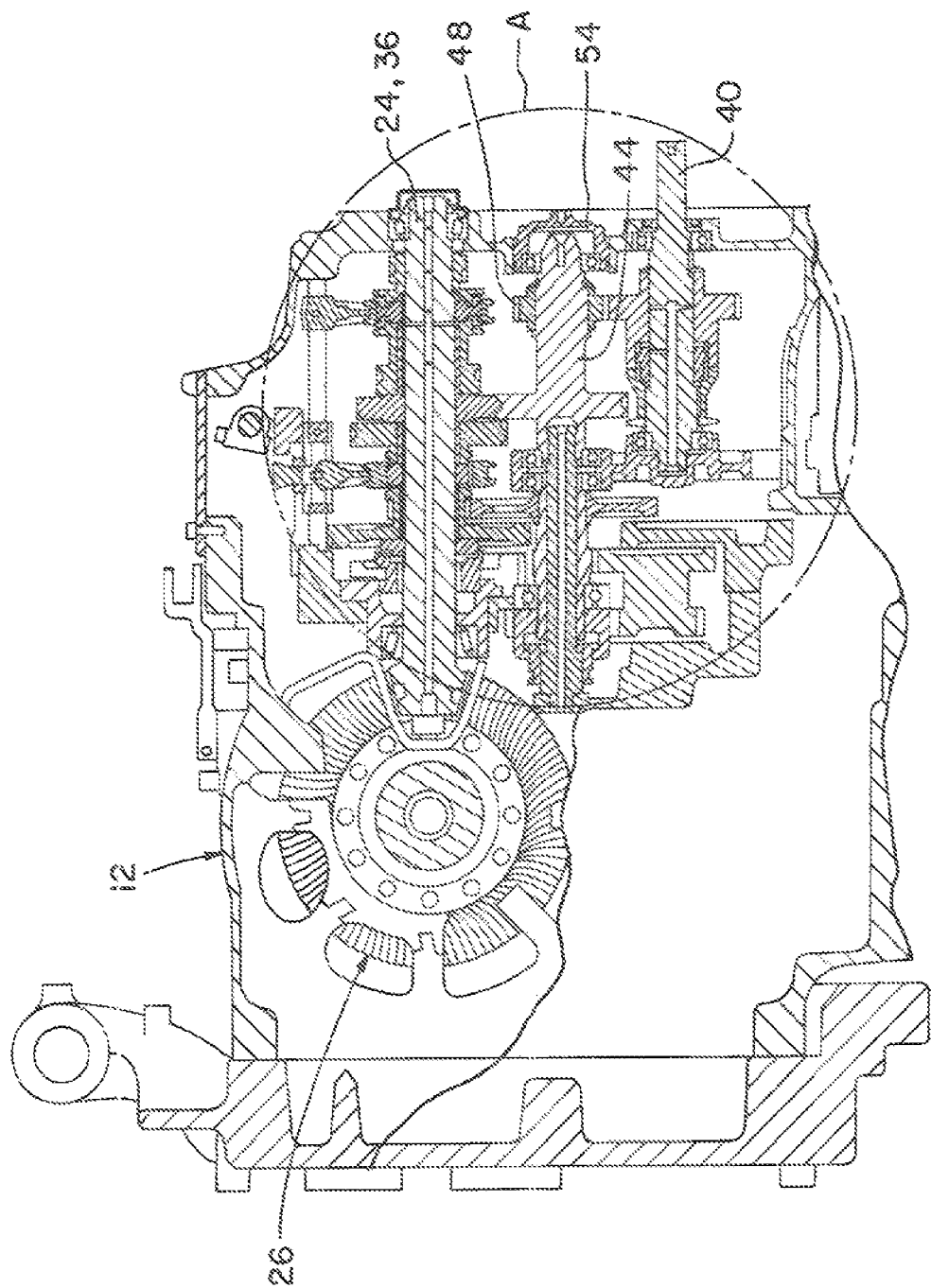
FIG. 2 is side, sectional view through the transmission shown in FIG. 1, taken along line 2-2.

Referring now to the drawings, and more particularly to FIGS. 1 and 2, there is shown a portion of a work machine 10 in the form of an agricultural tractor, particularly the rear end drive train of the tractor. Although shown as an agricultural tractor, it is possible that work machine 10 could be in the form of a different type of work machine, such as a construction tractor or forestry machine.

Tractor 10 includes a transmission 12 which is coupled with a rear end differential 14, which in turn drives a pair of rear axels 16. Each rear axel 16 includes an outboard hub 18 to which a respective rear drive wheel (not shown) s mounted.

Transmission 12 includes a driven shaft 20 which is mechanically coupled with and receives rotational input power from IC engine 22, shown schematically in FIG. 1. Driven shaft 20 transfers rotational power via appropriate gearing to differential drive shaft 24, which in turn extends from the rear of and provides rotational input power to differential rear end gear set 26 (see FIG. 2).

Figure 3:
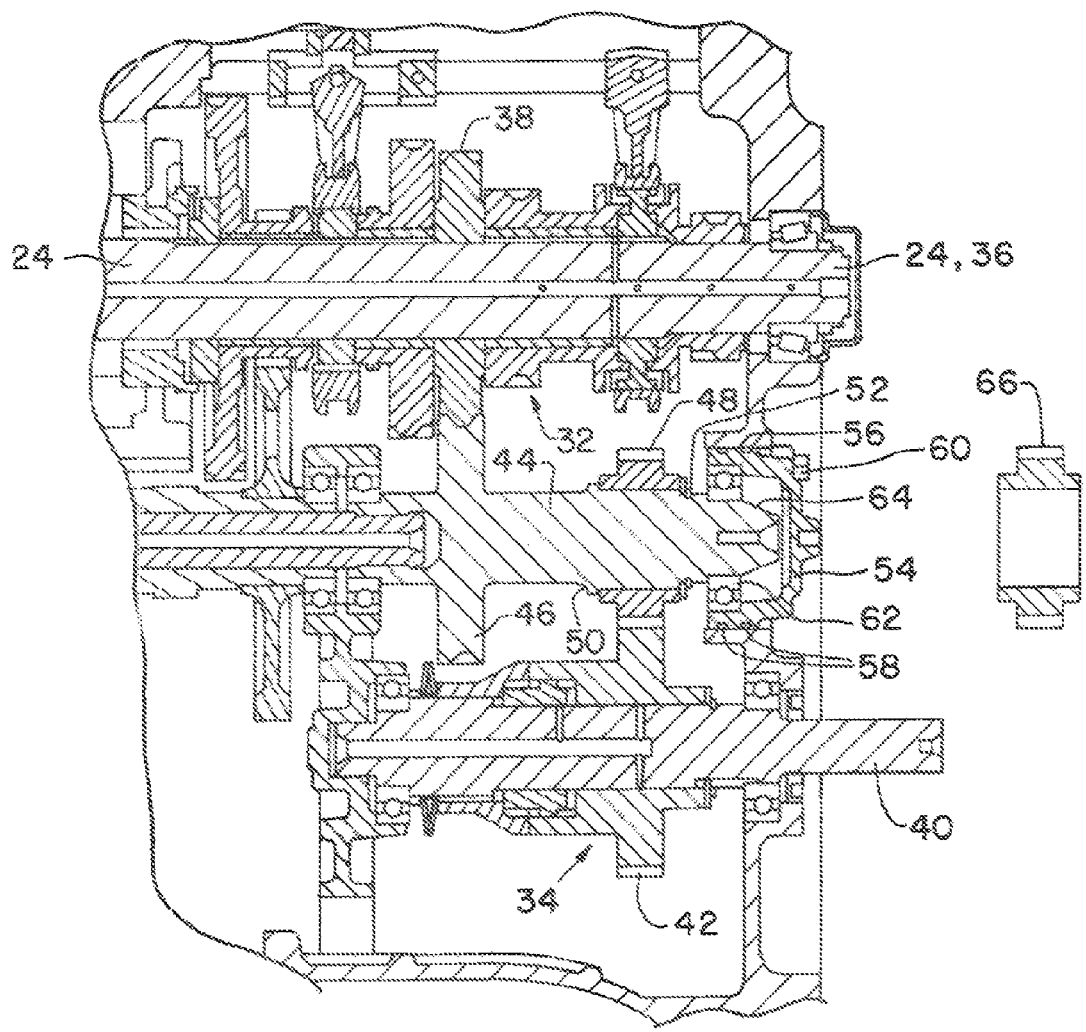
FIG. 3 is an enlarged view of detail A shown in FIG. 2.

Driven shaft 20 extends through and is rotatably carried by housing 28, which likewise houses and rotatably carries a number of other components. Also positioned within and carried by housing 28 is an idler arrangement 30 which mechanically interconnects between a power input 32 and a power output 34. Referring to FIGS. 2 and 3, power input 32 includes an input shaft 36 and an input gear 38 carried by input shaft 36. In the embodiment shown, input shaft 36 is in fact the differential drive shaft 24, but could be a different rotatable drive shaft providing input power to idler arrangement 30. Input shaft 36 receives input power from driven shaft 20 coupled with IC engine 22.

The terms power input 32 and power output 34 are used relative to idler arrangement 30. That is, power input 32 provides input power to idler arrangement 30, and power output 34 receives and provides power output from idler arrangement 30.

Power output 34 similarly includes an output shaft 40 and an output gear 42 carried by output shaft 40. In the embodiment shown, output shaft 40 extends through housing 28 and provides rotational output power to the MFWD at the front axle of tractor 10. Output gear 42 is clutched to output shaft 40 so that output gear 42 positively rotates with output shaft 40 when the MFWD is engaged by actuation of a switch (not shown) in the operator's station.

Figure 4:
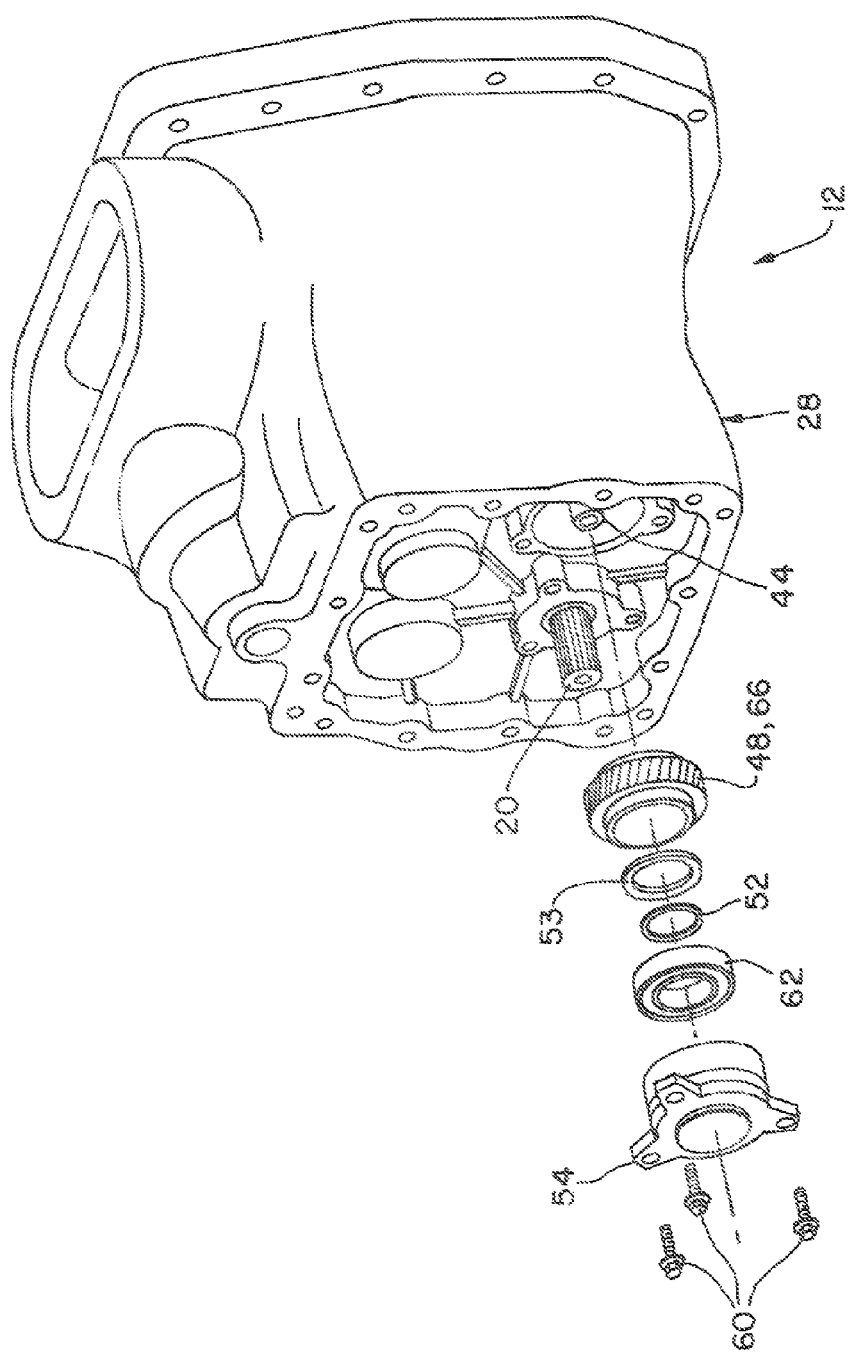
FIG. 4 is an exploded perspective view of the idler arrangement shown in FIG. 3.

Idler arrangement 30 (FIGS. 3 and 4) includes an idler shaft 44, driven gear 46 and drive gear 48. Driven gear 46 is rigidly fixed to idler shaft 44 and rotates therewith during operation. Drive gear 48 has an inside diameter which is splined to the outside diameter of idler shaft 44 when in an installed position. Drive gear 48 abuts against a shoulder 50 on idler shaft 44 for retention in one axial direction, and is retained by a snap ring 52 in the other axial direction (with a thrust washer 53 between snap ring 52 and drive gear 48).

An access cover 54 forms part of housing 28, and fits within an access opening 56 formed in housing 28. Access cover 54 carries a pair of annular seals 58 which seal with the inside diameter of access opening 56. Access cover 54 is fastened to housing 28 using three bolts 60, or other suitable fastening technique.

Access cover 54 also defines a bearing support which supports a bearing 62, which in turn has an inner race which rotatably carries an outboard end of idler shaft 44. The outboard end of idler shaft 44 has a chamfer 64 which provides easier piloting of idler shaft 44 into the inner race of bearing 62.

Under certain conditions of operation of tractor 10, such as a particular tire combination, etc., it may be desirable and/or necessary to change the input/output (I/O) ratio of idler arrangement 30, thereby changing the rotational drive speed of output shaft 40 to the MFWD. In the embodiment shown, t is possible to select between a plurality of drive gears on idler arrangement 30, including drive gear 48 and an additional drive gear 66 (FIG. 3). Each of drive gears 48 and 66 have a same inside diameter and same spline configuration allowing coupling with the exterior splines on idler shaft 44. Drive gears 48 and 66 differ from each other in that they have a different number of teeth and a slightly different overall outside diameter. In the embodiment shown, drive gear 48 has thirty teeth and drive gear 66 has thirty-one teeth, with an overall outside diameter change of less than one millimeter.

To exchange drive gear 66 for drive gear 48, or vice versa, fasteners 60 are removed from access cover 54, and access cover 54 is slid in an axial direction out of access opening 56. Bearing 62 is pressed within access cover 54 and is removed with access cover 54 from idler shaft 44. Snap ring 52 and thrust washer 53 are then removed from idler shaft 44 and withdrawn through access opening 56. Drive gear 48 is slid in an axial direction so that the interior splines disengage from the exterior splines on idler shaft 44. The overall outside diameter of drive gear 48 is slightly less than the inside diameter of access opening 56 so that drive gear 48 may be withdrawn through access opening 56. Drive gear 66 is then moved through access opening 56 and slid in an axial direction onto idler shaft 44 until seated against shoulder 50. Snap ring 52 and thrust washer 53 are re-installed on idler shaft 44, and access cover 54 is installed into access opening 56 and bolted to housing 28. During the insertion of access cover 54 into access opening 56, chamfer 64 self-centers idler shaft 44 within the inner race of bearing 62.

Using the present invention as described above, the I/O ratio of idler arrangement 30 to output shaft 40 may be changed. With conventional transmissions, it would be necessary to remove transmission 12 from rear end differential 14 and use a different transmission or disassemble/reassemble the various components and gears from the back side of transmission 12 to change the I/O ratio of output shaft 40. With the present invention, the I/O ratio may be quickly and easily changed without having to disassemble transmission 12 from rear end differential 14, or disassemble other components within transmission 12. The present invention therefore provides a fast and easy way to change the I/O ratio of output shaft 40 to the MFWD on the front axel.

Having described the preferred embodiment, it will become apparent that various modifications can be made without departing from the scope of the invention as defined in the accompanying claims.

The invention claimed is:

1. A transmission for a vehicle, comprising:
   a parallel shaft arrangement including a first gear shaft and a second gear shaft;
   a first gear removably mountable to and rotatable with the first gear shaft, the first gear having a first set of gear teeth meshable with a second gear of the second gear shaft;
   a replacement gear removably mountable to and rotatable with the first gear shaft, the replacement gear having a replacement set of gear teeth meshable with the second gear of the second gear shaft, the replacement set of gear teeth having a different number of gear teeth than the first set of gear teeth;
   first and second bearings associated with the first and second gear shafts;
   a gear housing containing the parallel shaft arrangement and having an end wall, the end wall having an access opening associated with the first gear shaft and a shaft opening carrying the second bearing which mounts the second gear shaft to be rotatable with respect to the gear housing and to extend through the end wall; and
   an access cover removably mounted to the end wall over the access opening and rotatably carrying the first bearing which mounts the first gear shaft to be rotatable with respect to the gear housing;
   wherein said access opening is configured so that the first gear and the replacement gear are movable through the access opening into and out of the gear housing when the access cover is in an uninstalled position; and
   wherein, when the first gear is mounted to the first gear shaft, the first gear meshes with the second gear to create a first gear ratio between the first and second gear shafts and, when the first gear is removed from the first gear shaft and the replacement gear is mounted to the first gear shaft, the replacement gear meshes with the second gear to create a second gear ratio between the first and second gear shafts.

2. The transmission of claim 1, further including a retainer mounted to the first gear shaft to axially space the first gear from the first bearing when the first gear is mounted to the first gear shaft.

3. The transmission of claim 2, wherein the retainer is a snap ring.

4. The transmission of claim 1, wherein the first bearing is removed from the first gear shaft upon removal of the access cover from the gear housing.

5. The transmission of claim 1, wherein the first gear and the replacement gear each have splines engageable with splines of the first gear shaft.

6. The transmission of claim 1, further including a driven gear rigidly affixed to the first gear shaft.

7. The transmission of claim 1, wherein she access cover is mounted to the gear housing with a plurality of fasteners.

8. The transmission of claim 1, wherein the first gear shaft is an idler shaft and the first gear is a drive gear.

9. The transmission of claim 1, further comprising:
a power input including an input shaft and an input gear carried by the input shaft;
wherein the first gear shaft is an idler gear shaft and the first gear is a drive gear, and wherein the second gear shaft is an output gear shaft and the second gear is an output gear;
wherein mating the drive gear and the output gear couples the output gear shaft to the power input at the first gear ratio, and wherein mating the replacement gear and the output gear couples the output gear shaft to the power input at the second gear ratio.

10. The transmission of claim 1, wherein the access cover covers an axial end of the first gear shaft when in an installed position.

11. A work machine, comprising:
an engine; and
a transmission coupled to the engine, the transmission including:
  a parallel shaft arrangement including a first gear shaft and a second gear shaft;
  a first gear removably mountable to and rotatable with the first gear shaft, the first gear having a first set of gear teeth meshable with a second gear of the second gear shaft;
  a replacement gear removably mountable to and rotatable with the first gear shaft, the replacement gear having a replacement set of gear teeth meshable with the second gear of the second gear shaft, the replacement set of gear teeth having a different number of gear teeth than the first set of gear teeth;
first and second bearings associated with the first and second gear shafts;
a gear housing containing the parallel shaft arrangement and having an end wall, the end wall having an access opening associated with the first gear shaft and a shaft opening carrying the second bearing which mounts the second gear shaft to be rotatable with respect to the gear housing and to extend through the end wall; and
an access cover removably mounted to the end wall over the access opening and rotatably carrying the first bearing which mounts the first gear shaft to be rotatable with respect to the gear housing;
wherein said access opening is configured so that the first gear and the replacement gear are movable through the access opening into and out of the gear housing when the access cover is in an uninstalled position; and
wherein, when the first gear is mounted to the first gear shaft, the first gear meshes with the second gear to create a first gear ratio between the first and second gear shafts and, when the first gear is removed from the first gear shaft and the replacement gear is mounted to the first gear shaft, the replacement gear meshes with the second gear to create a second gear ratio between the first and second gear shafts.

* * * * *